(12) United States Patent
Kittel Riel et al.

(10) Patent No.: US 9,106,143 B2
(45) Date of Patent: Aug. 11, 2015

(54) AC/DC CONVERTER WITH GALVANIC INSULATION AND SIGNAL CORRECTOR

(75) Inventors: Lisandra Kittel Riel, Boulogne-Billancourt (FR); Marc Pontrucher, Boulogne-Billancourt (FR); Nicolas Domblides, Boulogne-Billancourt (FR); Tony Fourmont, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/237,323

(22) PCT Filed: Aug. 1, 2012

(86) PCT No.: PCT/EP2012/065071
§ 371 (c)(1),
(2), (4) Date: May 6, 2014

(87) PCT Pub. No.: WO2013/023925
PCT Pub. Date: Feb. 21, 2013

(65) Prior Publication Data
US 2014/0293661 A1   Oct. 2, 2014

(30) Foreign Application Priority Data

Aug. 12, 2011 (FR) ...................................... 11 57335

(51) Int. Cl.
*H02M 3/335* (2006.01)
*H02M 1/42* (2007.01)
*H02M 1/00* (2007.01)

(52) U.S. Cl.
CPC ...... *H02M 3/33507* (2013.01); *H02M 3/33546* (2013.01); *H02M 1/4258* (2013.01); *H02M 3/33523* (2013.01); *H02M 2001/0009* (2013.01)

(58) Field of Classification Search
CPC ............. H02M 2001/0009; H02M 2001/0022; H02M 3/335; H02M 3/33507; H02M 3/33523; H02M 3/33546; H02M 3/33553; H02M 1/4258

USPC ............. 363/21.01, 21.04, 21.1, 21.12, 21.18
See application file for complete search history.

(56) References Cited

U.S. PATENT DOCUMENTS 5,694,304 A * 12/1997 Telefus et al. .............. 363/21.03
(Continued)

FOREIGN PATENT DOCUMENTS

FR   2 925 790 A1   6/2009
GB   2 460 272 A    11/2009
(Continued)

OTHER PUBLICATIONS

Hernán Emilio Tacca, "Single-Switch Two-Output Flyback-Forward Converter Operation," *IEEE Transactions on Power Electronics*, vol. 13, No. 5, Sep. 1998, pp. 903-911.

*Primary Examiner* — Fred E Finch, III
(74) *Attorney, Agent, or Firm* — Muncy, Geissler, Olds & Lowe, P.C.

(57) ABSTRACT

An AC/DC converter comprising an input rectifier circuit connected in series with a primary winding (5) of an isolating transformer (6) and to a chopper switch (T1) driven by a control circuit (10) using pulse width modulation on the basis of a signal representative of a primary current, the isolating transformer having a first secondary winding (7) that is wound in the same direction as the primary winding and that is connected to an output line (8) of the converter via a diode (D4) and a filter coil (L1), and a second secondary winding (9) that is wound in the opposite direction to the primary winding and that is connected directly to the output line via a diode (D2), the output line being connected to an output capacitor (Cout). The converter includes an analog correction circuit for correcting the primary current, which circuit is connected to the control circuit and to a measurement element (30) delivering a signal representative of the primary current, and is arranged to transform said signal into a triangular signal suitable for driving the control circuit.

1 Claim, 1 Drawing Sheet

(56) References Cited

U.S. PATENT DOCUMENTS

Figure 1:
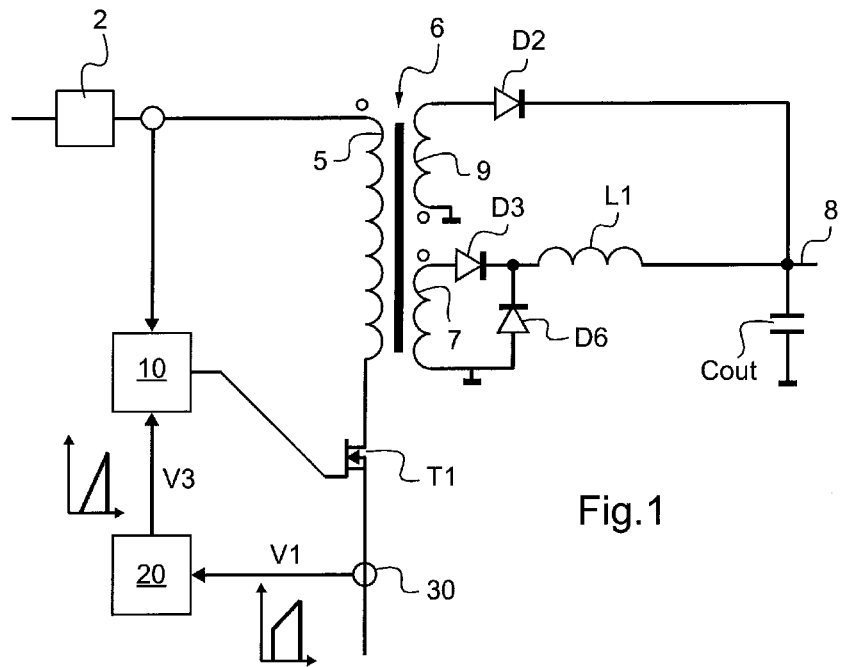

| | | | |
|---|---|---|---|
| 5,712,772 A * | 1/1998 | Telefus et al. | 363/21.02 |
| 6,011,702 A * | 1/2000 | Gucyski | 363/21.04 |
| 6,324,079 B1 * | 11/2001 | Collmeyer et al. | 363/21.15 |
| 7,773,399 B2 * | 8/2010 | Nakamura et al. | 363/127 |
| 8,009,448 B2 * | 8/2011 | Liu | 363/56.12 |
| 2009/0122579 A1 * | 5/2009 | Senaj | 363/21.04 |
| 2009/0196075 A1 * | 8/2009 | Arduini | 363/21.06 |
| 2010/0067259 A1 * | 3/2010 | Liu | 363/21.01 |

FOREIGN PATENT DOCUMENTS

| | | | |
|---|---|---|---|
| JP | 06078532 A | * | 3/1994 |
| JP | 2010 051107 A | | 3/2010 |

* cited by examiner

AC/DC CONVERTER WITH GALVANIC INSULATION AND SIGNAL CORRECTOR

The present invention relates to an alternating current (AC) to direct current (DC) converter with electrical isolation and suitable for use for example in the electricity distribution network of an aircraft.

In an airplane, electrical energy is delivered by means of an alternator driven by an engine of the airplane. The alternator delivers an alternating voltage that is converted into a DC voltage for use by pieces of electrical equipment on board the airplane. In its simplest version, such conversion is performed by means of a transformer having a primary winding connected to the alternator and a secondary winding connected to a rectifier bridge associated with a filter capacitor. The output voltage from the rectifier bridge is a fullwave rectified sinewave, while the current consumption is subjected to a high level of distortion that reduces the efficiencies of the transformer and of the alternator, heats the conductors, and produces electromagnetic radiation at high frequency, which is a source of interference.

One way of remedying that drawback is to perform series filtering on the primary circuit of the transformer. Nevertheless, that option is not always appropriate when the frequency of the alternating voltage is variable, as when an alternator is driven by a jet turbine so that its frequency varies over the range 360 hertz (Hz) to 800 Hz, approximately.

It is also known to have recourse to a power factor corrector (PFC) circuit for reducing the distortion by forcing the consumed current to track a waveform identical to the waveform of the input voltage, i.e. a fullwave rectified sinewave.

Various PFC structures exist.

In a "boost" type structure, the circuit does not have electrical isolation, which makes it necessary for the circuit to be associated with a DC/DC converter that performs this function. Such an assembly presents overall efficiency that is relatively low, and also size and weight that are large.

In a "flyback" type structure, the circuit has an isolating transformer with primary and secondary windings that are wound in opposite directions. The operation of PFC circuits of this type leads to large quantities of energy being stored periodically in the magnetic core of the transformer. It is therefore necessary to use large transformers for large powers, thereby increasing the weight and the size of the circuit.

In a "forward" type structure, the circuit likewise has an isolating transformer, but its primary and secondary windings are wound in the same direction. In this type of circuit, it is not possible to use current over the entire sinewave that is obtained, and thus to consume current that tracks the waveform of the input voltage.

Proposals are made in document FR-A-2 925 790 for an AC/DC converter structure of improved performance that includes an isolating transformer with a primary winding connected to a chopper switch driven by a control circuit operating with pulse width modulation (PWM), a first secondary winding that is wound in the same direction as the primary winding and that is connected to an output line of the converter via a diode and a filter coil, and a second secondary winding that is wound in the opposite direction to the primary winding and that is connected directly to the output line via a diode. Thus, for medium to high voltages, energy is transferred to the output via the first secondary winding, the diode, and the filter coil. This makes it possible to pass high powers. When the voltage is low, the energy stored in the magnetic core of the transformer may be transferred, when the chopper switch opens, to an output capacitor of the output line via the second secondary winding and the diode that is connected thereto. The second secondary winding thus makes it possible for the energy that is stored in the magnetic core to be discharged to the output, and thus avoids energy being wasted. It also makes it possible to deliver energy for consumption, as used by the output, for voltages that are low (the low amplitude portions of the sinewave). Furthermore, the residual flux present in the core when the chopper switch is opened excites the second secondary winding, which discharges the corresponding energy to the output, thereby minimizing the appearance of surges when the chopper switch opens, which surges run the risk of damaging the chopper switch. A single conversion stage thus makes it possible to achieve electrical isolation and a PFC function in a manner that is simple, reliable, and effective because of efficiency that is relatively high.

Although the advantages of that solution are clear, they nevertheless present in practice the drawback of being difficult to make compatible with a PWM-PFC regulator operating in peak-current mode. For low voltages, when only the second primary winding is conducting, the primary current presents a triangular waveform (characteristic of flyback type operation) that is entirely suited to such a mode of operation. In contrast, for medium to high voltages, the two secondary windings conduct in succession, giving rise to a primary current of trapezoidal waveform that is the result of superposing the triangular waveform characteristic of flyback type operation on the almost square waveform that is characteristic of forward type operation. Unfortunately, such a trapezoidal waveform is detrimental to good operation of such a regulator (in compliance with the standard DO-160).

An object of the invention is to provide a converter that does not present the above drawbacks.

To this end, the invention provides an AC/DC converter comprising an input rectifier circuit connected in series with a primary winding of an isolating transformer and to a chopper switch driven by a control circuit using pulse width modulation on the basis of a signal representative of a primary current, the isolating transformer having a first secondary winding that is wound in the same direction as the primary winding and that is connected to an output line of the converter via a diode and a filter coil, and a second secondary winding that is wound in the opposite direction to the primary winding and that is connected directly to the output line via a diode, the output line being connected to an output capacitor. The converter includes an analog correction circuit for correcting the primary current, which circuit is connected to the control circuit and to a measurement element delivering a signal representative of the primary current, and is arranged to transform said signal into a triangular signal suitable for driving the control circuit.

Thus, the analog correction circuit enables the control circuit to operate in optimum manner by sending it a triangular signal instead of the trapezoidal signal that would normally be delivered to the control circuit.

In a particular embodiment, the analog correction circuit comprises a main line having connected in series therein, in succession: a first resistor; a first switch; a second resistor and the control circuit; there being a first capacitor connected firstly to the main line between the first resistor and the first capacitor and secondly to ground; a second switch connected firstly to the main line between the second resistor and the control circuit, and secondly to a third resistor that is also connected to ground; and a second capacitor connected firstly to the main line between the connection between the second switch and the control circuit, and secondly to ground.

This embodiment is particularly simple.

Other characteristics and advantages of the invention appear on reading the following description of a particular, non-limiting embodiment of the invention.

Figure 2:
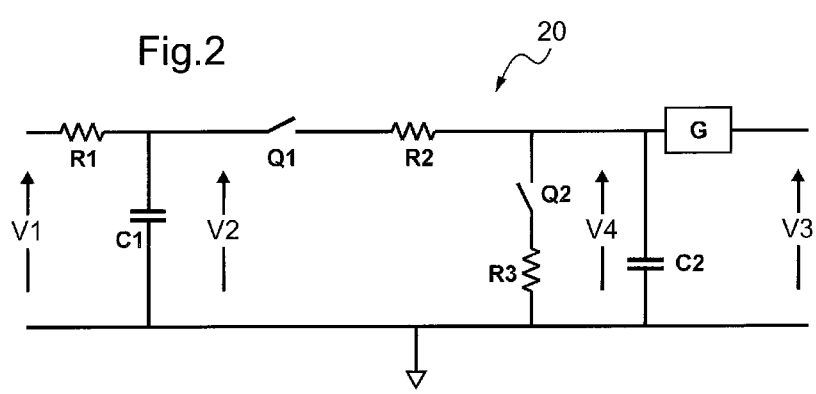

Reference is made to the accompanying drawing, in which:

FIG. 1 is a circuit diagram of a converter in accordance with the invention; and FIG. 2 is a detail view of the correction module.

With reference to FIG. 1, the converter in accordance with the invention is for having its input connected to an AC electricity distribution network and its output connected to at least one piece of electronic equipment that operates on DC.

The converter is generally the same as that described in document FR-A-2 925 790, such that the description below is given in detail only for the portions thereof that are needed for understanding the present invention.

At its input, the converter has a filter circuit connected to the input terminals of a rectifier circuit 2. The filter is known and not shown.

The rectifier circuit comprises a diode bridge having a first output terminal connected to a current-measuring shunt and a second output terminal connected firstly to an input divider bridge and secondly to a primary winding 5 of an isolating transformer 6 in series with a chopper switch T1. The chopper switch T1 is a power transistor such as a metal oxide semi-conductor field effect transistor (MOSFET) with a gate, or an insulated gate bipolar transistor (IGBT). The chopper switch T1 is connected to a control circuit, or more precisely to a chopping control circuit 10 that is described below. The isolating transformer 6 possesses a first secondary winding 7 wound in the same direction as the primary winding 5 and connected in series with an output line 8 of the converter via a diode D3 and a filter coil L1 (commonly referred to as a choke). A freewheel diode D6 connects ground to the filter coil L1 in conventional manner for ensuring current continuity when the diode D3 is not conducting (energy being restored by the filter coil L1).

The isolating transformer 6 has a second secondary winding 9 wound in the opposite direction to the primary winding 5 and connected via a diode D2 directly to the output line 8, i.e. downstream from the coil L1.

The output line 8 is also connected to an output capacitor Cout and to an output divider bridge (not shown).

The chopping control circuit 10 is a circuit operating by pulse width modulation, of structure and operation that are themselves known, and arranged to control the chopper switch T1 as a function of comparing a voltage that is an image of current being consumed at the input of the converter with a signal having a fullwave rectified sinusoidal waveform of amplitude that depends on an error voltage between the output voltage from the converter and a reference voltage.

The chopping control circuit 10 is driven in particular as a function of the primary current measured downstream from the chopper switch T1. The chopping control circuit is connected for this purpose to an analog correction circuit 20 that supplies it with a signal V3 that is an image of the primary current obtained from a signal V1 that is representative of the primary current delivered by a measurement element given reference 30 in FIG. 1.

The analog correction circuit 20 comprises a main line having connected in series therein, in succession: a resistor R1, a switch Q1, a resistor R2, and the chopping control circuit 10. A capacitor C1 is connected firstly to the main line between the resistor R1 and the switch Q1 and secondly to ground. A switch Q2 is connected firstly to the main line between the resistor R2 and the control circuit 10, and secondly to a resistor R3 that is connected in turn to ground. A capacitor C2 is connected firstly to the main line between the connection with the switch Q2 and the control circuit 10, and secondly to ground.

The operation of the correction circuit takes place in three stages:

using R1 and C1 to measure the mean (DC) value V2 of the trapezoidally-shaped signal V1 that is representative of the mean value of the primary current;

producing a triangular signal at the terminals of C2 by charging the capacitor C2 with a time constant $\tau = R2C2$ after closure of the switch Q1 (the voltage V4 at the terminals of C2 is triangular); and discharging the capacitor C2 with a time constant $\tau = R3C2$ as from closure of the switch Q2.

The converter works on the principle of using pulse width modulation to control the chopper switch T1 so as to force the consumed current to follow a waveform that is identical to that of the voltage, i.e. a fullwave rectified sinewave. To do this, the signal from the input divider bridge, representative of the voltage at the output from the rectifier circuit (fullwave rectified sinewave) is multiplied by a signal representative of an error voltage that results from comparing the voltage from the output divider bridge with a reference voltage. The product of these signals is a signal having a fullwave rectified sinusoidal waveform of amplitude that depends on the error in the output voltage. This signal is compared, with hysteresis, to the voltage that is the image of the current being consumed in order to be applied to the grid of the chopper switch T1, after a time delay.

Thus, on opening of the chopper switch T1, when the voltage is low (output voltage less than a threshold equal to the product of the input voltage multiplied by the transformation ratio, i.e. 1.5), the energy stored in the magnetic core of the isolating transformer 6 excites the second secondary winding 9 and is transferred to the output line 8 via the diode D2. The operation of the converter is then similar to that of a flyback type converter.

Once the output voltage has increased until it reaches a threshold equal to the product of the input voltage multiplied by the transformation ratio, the diode D3 conducts and the energy from the magnetic core is transferred to the output line via the first winding 7, the diode D3, and the filter coil L1. The operation of the converter is then similar to that of a forward type converter.

There is thus a self-oscillating system that is servo-controlled on the amplitude of the error voltage, which is itself in the form of a fullwave rectified sinewave, thus making it possible to obtain an accurate output voltage and current consumption that is sinusoidal.

The gain G of the correction system is adjusted as a function of the desired output power, such that modifying the desired output power requires a corresponding change in the gain.

Naturally, the invention is not limited to the embodiments described but covers any variant coming within the ambit of the invention as defined by the claims.

In particular, the correction circuit may be modified: the components Q1 and R2 may be interchanged without its operation being changed. The same applies to the components Q2 and R3, which may likewise be interchanged.

The invention claimed is:

1. An AC/DC converter comprising:
an input rectifier circuit connected in series with a primary winding of an isolating transformer and to a chopper switch driven by a control circuit using pulse width modulation on the basis of a signal representative of a primary current, wherein the isolating transformer comprises:
  a first secondary winding that is wound in a same direction as the primary winding and that is connected to an output line of the converter via a first diode and a filter coil; and
  a second secondary winding that is wound in an opposite direction to the primary winding and that is connected directly to the output line via a second diode, the output line being connected to an output capacitor (Cout), and
wherein the converter comprises an analog correction circuit for correcting the primary current, which circuit is connected to the control circuit and to a measurement element delivering a signal representative of the primary current, and is arranged to transform said signal into a triangular signal suitable for driving the control circuit,
wherein the analog correction circuit comprises a main having connected in series therein, in succession:
  a first resistor;
  a first switch;
  a second resistor and the control circuit;
  there being a first capacitor connected firstly to the main line between the first resistor and the first switch and secondly to ground;
a second switch connected firstly to the main line between the second resistor and the control circuit, and secondly to a third resistor that is also connected to ground; and
a second capacitor connected firstly to the main line between the connection between the second switch and the control circuit, and secondly to ground.

* * * * *